United States Patent
Baumann et al.

[11] Patent Number: 5,970,849
[45] Date of Patent: Oct. 26, 1999

[54] COFFEE MAKER

[75] Inventors: Heinrich Baumann; Manfred Matuschek, both of Solingen, Germany

[73] Assignee: Robert Krups GmbH & Co. KG, Solingen, Germany

[21] Appl. No.: 09/153,906

[22] Filed: Sep. 16, 1998

[51] Int. Cl.$^6$ .................................................. A47J 31/24
[52] U.S. Cl. ............................... 99/299; 99/279; 99/306
[58] Field of Search ............................ 99/299, 295, 279, 99/300, 304, 305, 306, 307, 316; 426/433

[56] References Cited

U.S. PATENT DOCUMENTS

| | | | |
|---|---|---|---|
| 4,805,523 | 2/1989 | Stuckey et al. | 99/299 X |
| 5,085,135 | 2/1992 | Collignon | 99/299 |
| 5,133,247 | 7/1992 | Paskrick | 99/299 X |

*Primary Examiner*—Reginald L. Alexander
*Attorney, Agent, or Firm*—Darby & Darby

[57] ABSTRACT

The invention relates to a domestic coffee maker having in a housing (1) with a front face, a cold water tank and a filter (4) having an outflow orifice (7) situated above an infusion collection jug (8) resting on a base (9). The filter (4) is equipped with a shut-off valve (13) for the outflow orifice (7). The shut-off valve is controlled by an actuating device which is movable relative to the housing. Displacement of the actuating device is caused by the positioning and removal of the jug (8) on the base. A substantial portion of the base (9) projects beyond the front face of housing (1). The filter (4) is enclosed within the housing (1). The actuating device comprises a rod (14) which is mounted to slide horizontally under the filter (4) against the urging of an elastic device (15). One end (16) of the rod (14) controls the valve (13). Movement of the rod (14) is controlled by a movement multiplier device actuated in response to the presence or absence of the pouring spout (12).

5 Claims, 3 Drawing Sheets

FIG_1
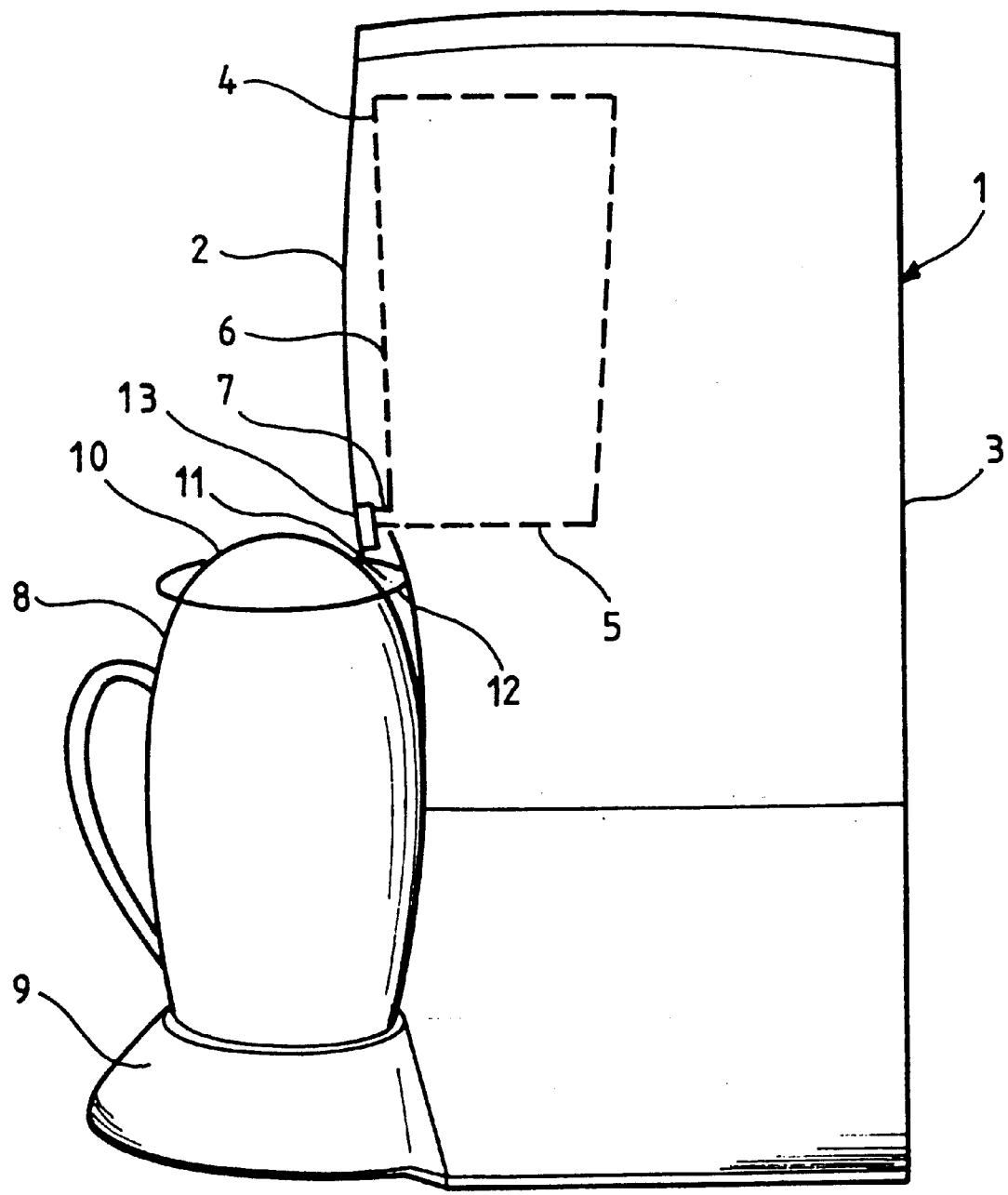

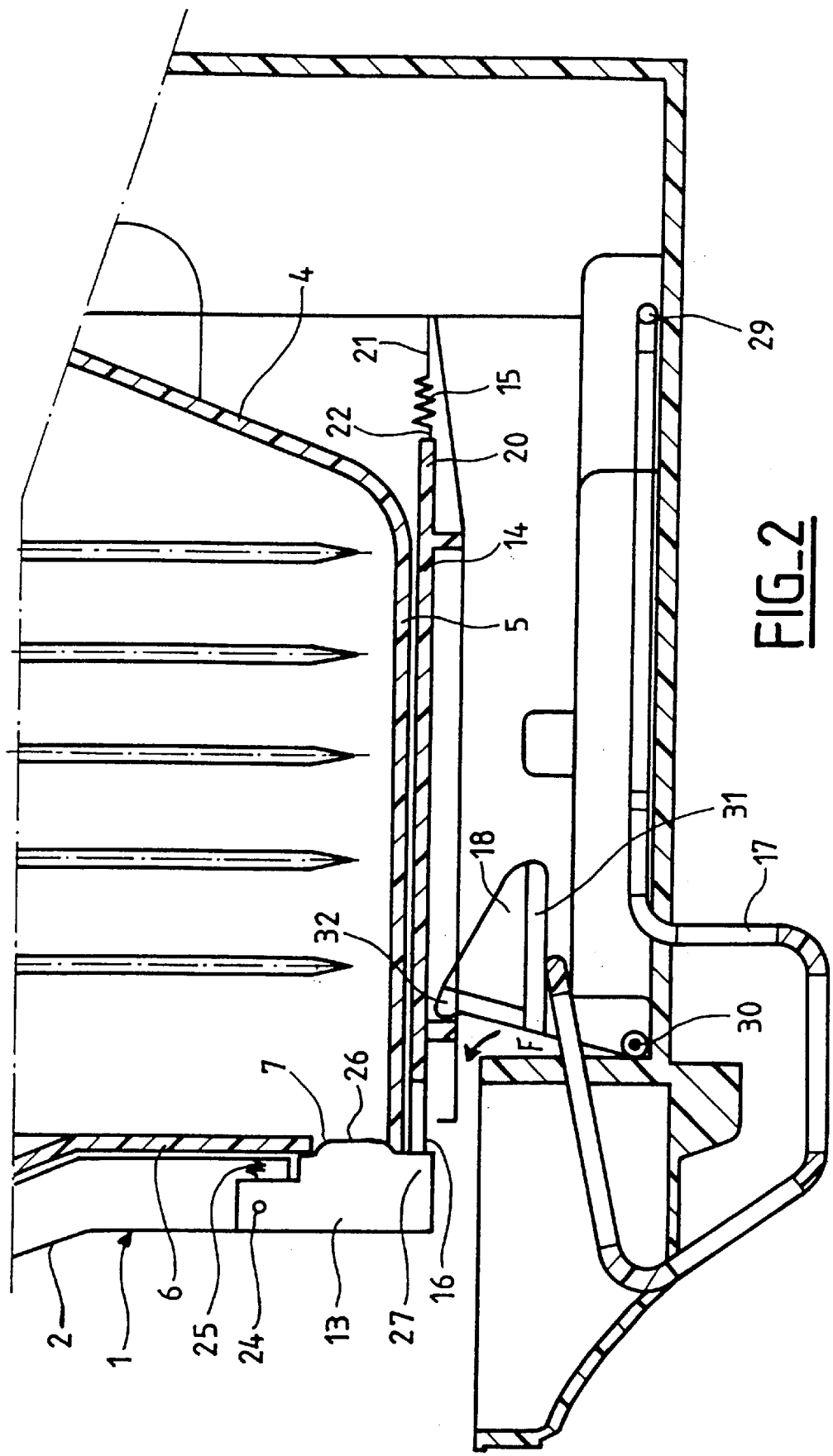
FIG_2

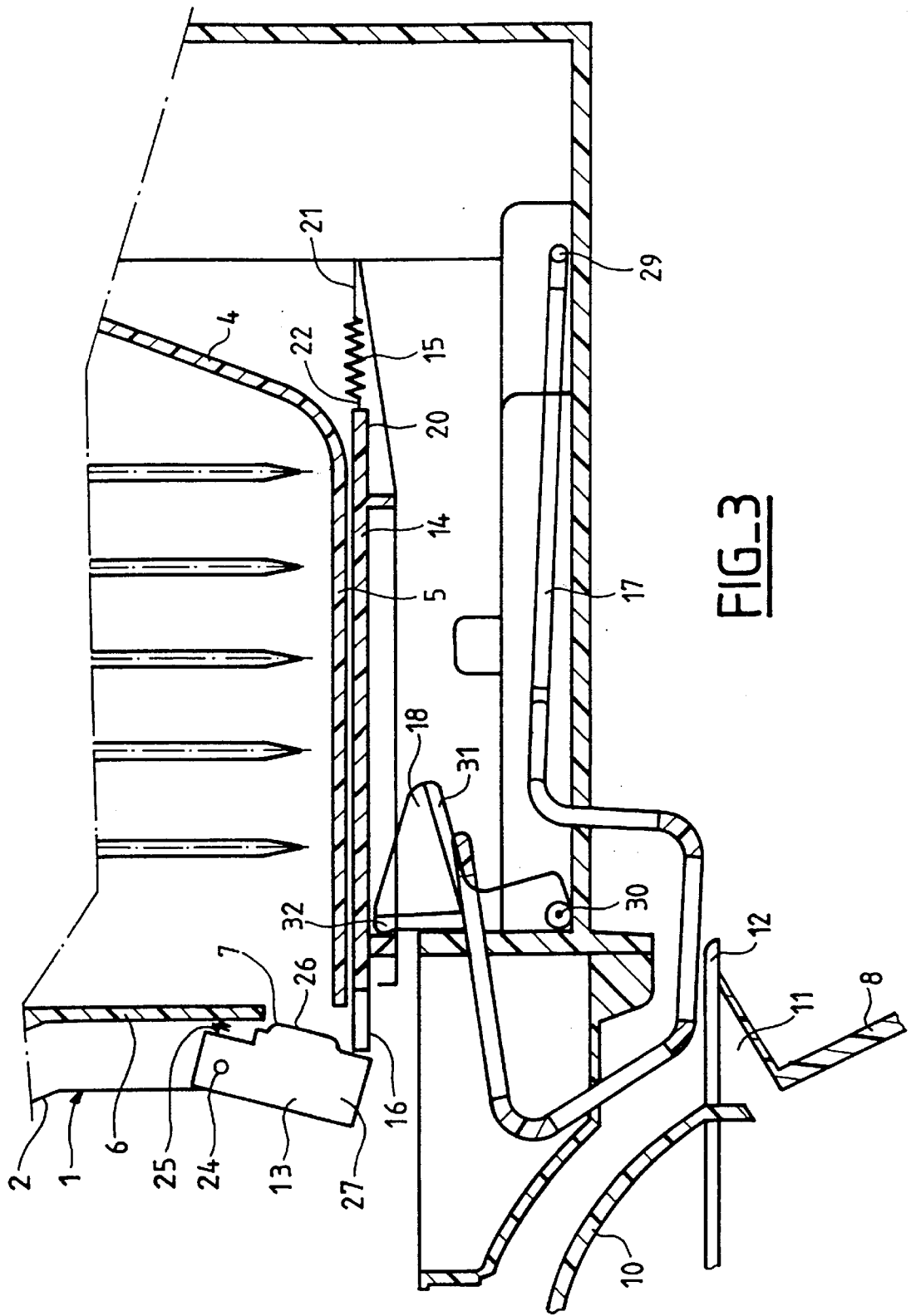
FIG_3

COFFEE MAKER

BACKGROUND OF THE INVENTION

FIELD OF THE INVENTION

The present invention relates to domestic coffee makers comprising, in a housing having a lateral surface possessing a front face and a rear face, a cold water tank feeding a water heater which itself feeds a sprinkling nozzle whose outlet is arranged in a sprinkling position above a filter intended to contain coffee grounds, possessing a bottom and a lateral wall and having an outflow orifice situated above an infusion collection jug resting on a base and having a lid provided with an aperture through which the infusion enters and possessing a pouring spout opposite which said aperture is situated.

The invention relates more specifically to coffee makers of this type in which said filter is equipped with a shut-off valve for the outflow orifice controlled by actuation means which are movable relative to the housing and whose displacement is caused by the positioning and removal of the jug, such that said removal causes the complete closure of the valve while positioning results in the opening thereof by acting on the actuating means.

In the known coffee makers of this type, the filter containing the coffee grounds has to overhang the infusion collection jug, which limits the construction of a filter/jug/ base assembly and complicates integration into the housing. Thus, in some cases, the construction of the coffee maker is bulky and aesthetically displeasing, while giving rise to additional cost.

OBJECT OF THE INVENTION

The object of the present invention is to remedy the above-mentioned disadvantages by producing a domestic coffee maker which is simple to construct and easy to use.

SUMMARY OF THE INVENTION

More specifically, a domestic coffee maker according to the invention is a domestic coffee maker wherein a substantial portion of the base projects beyond the front face of the housing, a filter is enclosed in the housing and an outflow orifice is situated proximal to the front face of the housing. A shut-off valve for the outflow orifice is controlled by an actuating means which responds to the presence or absence of the pouring spout of the jug. The actuating means for the valve may comprise a rod mounted to slide horizontally under the filter against the urging of an elastic means. One end of the rod controls the valve. The rod is controlled by a movement multiplier device actuated by the presence or absence of the pouring spout.

By virtue of the embodiment of the domestic coffee maker according to the invention, when the infusion collection jug is resting on the projecting base, the filter integrated into the housing no longer entirely overhangs the infusion collection jug and, hence, the size of the housing is substantially reduced, which reduces the bulk of the coffee maker.

Furthermore, thanks to a simple construction of the actuating means, in particular of the multiplier device, the infusion collection jug is easily placed on the base of the housing and allows, by gentle actuation of the pouring spout, the sliding of the shut-off valve which opens the infusion outflow orifice.

BRIEF DESCRIPTION OF THE DRAWINGS

The features and advantages of the invention will further become apparent from the description which follows, given by way of a nonlimiting example, with reference to the attached drawings, in which:

FIG. 1 shows a diagrammatic perspective view of a housing of a coffee maker according to the invention;

FIG. 2 shows a partial vertical section on a larger scale of the actuating means of a valve of the coffee maker according to the invention after removal of the infusion collection jug and, therefore, with the shut-off valve in the completely closed position of the infusion outflow orifice;

FIG. 3 is a view similar to FIG. 2 with the infusion collection jug in position and, therefore, with the shut-off valve in the completely opened position of the infusion outflow orifice.

DETAILED DESCRIPTION OF THE PREFERRED EMBODIMENT

According to FIG. 1, a domestic coffee maker comprises, in a housing 1 having a lateral surface of generally tubular form possessing a front face 2 and a rear face 3, a cold water tank (not shown) feeding a water heater (not shown) which itself feeds a sprinkling nozzle (not shown) whose outlet is arranged in the sprinkling position above a filter 4, shown in broken lines, intended to contain coffee grounds and possessing a bottom 5 and a lateral wall 6. The filter 4 has an outflow orifice 7 situated above an infusion collection jug 8 resting on a base 9, having a lid 10 provided with an aperture 11 through which the infusion enters and possessing a pouring spout 12 opposite which said aperture 11 is situated.

The outflow orifice 7 is equipped with a shut-off valve 13 controlled by actuation means which are movable relative to the housing 1 and whose displacement is caused by the positioning and removal of the jug 8, such that said removal of the jug 8 causes the complete closure of the valve 13 while positioning results in the opening thereof by acting on the actuating means.

According to the invention, and as shown in FIGS. 2 and 3, a substantial portion of the base 9 projects beyond the front face 2 of the housing 1. The filter 4 is enclosed in the housing 1 such that the outflow orifice 7 is positioned proximal to the front face 2 of the housing 1. The shut-off valve 13 is controlled by actuation means responding to the presence or absence of the pouring spout 12 of the jug 8. The actuating means comprise a rod 14, which is mounted to slide horizontally under the filter 4 against an elastic means 15. A first end 16 of the rod 14 controls the valve 13. The rod 14 is controlled by a movement multiplier device actuated by the presence or absence of the pouring spout 12. Such a multiplier device comprises, for example, two levers, a contact lever 17 and a transmitting lever 18, each pivotably fixed to the housing 1. The contact lever 17 is actuated by the pouring spout 12. The transmitting lever 18 directly actuates the rod 14.

The rod 14 possesses a free end 20 opposite the first end 16. The elastic means comprises a return spring 15 having an end 21 connected to the housing 1 and an opposite end 22 connected to the free end 20 of the rod 14.

In a preferred example of the embodiment which is shown in FIGS. 2 and 3, the outflow orifice 7 of the filter 4 is positioned in the lateral wall 6 of the filter 4 in the vicinity of its bottom 5.

The valve 13 has an arm which is mounted to pivot about a horizontal spindle 24 against the urging of a second elastic means 25 and which possesses a shut-off plug 26 for the outflow orifice 7 of the filter 4. A free end 27 of the arm of the valve 13 is in contact with the end 16 of the rod 14. The second elastic means 25 is, for example, a spring.

The contact lever 17 is mounted to pivot about a horizontal spindle 29 and can be moved to transmit a vertical movement. The transmitting lever 18 is mounted to swing about another horizontal spindle 30 and comprises a first arm 31 and a second arm 32 connected by an elbowed piece. The arm 31 engages the contact lever 17 and the second arm 32 engages the rod 14. The spindles 29 and 30 are parallel and solidly fixed to the housing.

In order to provide a better understanding of the invention, we will describe the functioning of the coffee maker when a user desires to make a brew of coffee. Thus, the user having on the one hand filled with water a portion of the tank corresponding to a particular desired quantity of infusion, and on the other hand filled the filter with coffee grounds, said user positions the infusion collection jug 8 on the base 9. The pouring spout 12 of the infusion collection jug exerts a thrust on the contact lever 17 which undergoes a vertical movement upward. Said contact lever 17 causes the arm 31 of the transmitting lever 18 to swing in the direction of the arrow F and the other arm 32 of the transmitting lever 18 thus exerts a thrust on the rod 14 and causes it to slide horizontally against the urging of the spring 15. The rod 14 displaces the shut-off valve 13 against the urging of the second elastic means 25 and opens the outflow orifice 7 of the filter 4 to allow the infusion to flow freely out into the infusion collection jug 8 via the aperture 11 made between the spout 12 and the lid 10.

By virtue of providing the actuating means according to the invention, improved operation of the valve 13 is achieved in the form of improved movement, ease of operation and rapid response to the positioning of the infusion collection jug 8 on the base 9 of the housing 1 of the domestic coffee maker.

Having described the presently preferred exemplary embodiment of a new and improved coffee maker in accordance with the present invention, it is believed that other modifications, variations and changes will be suggested to those of skill in the art in view of the teachings set forth herein. It is, therefore, to be understood that all such modifications, variations and changes are believed to fall within the scope of the present invention as defined by the claims appended hereto.

What is claimed is:

1. A domestic coffee maker comprising, in a housing having an outer surface with a front face and a rear face, a cold water tank feeding a water heater, the water heater feeding a sprinkling nozzle in a sprinkling position above a filter intended to contain coffee grounds, the filter having a bottom and a side wall and having an outflow orifice situated above an infusion collection jug resting on a base and having a lid provided with an aperture through which the infusion enters and possessing a pouring spout opposite which said aperture is positioned, said filter being equipped with a shut-off valve for the outflow orifice, the shut-off valve controlled by actuation means which are movable relative to the housing and whose displacement is caused by the positioning and removal of the jug relative to the base, such that said removal causes the complete closure of the shut-off valve while positioning results in the opening thereof by acting on the actuating means, wherein, a portion of the base projects substantially beyond the front face of the housing and the filter enclosed in the housing, the outflow orifice is positioned proximal to the front face of the housing and the shut-off valve is controlled by the pouring spout of the jug, and wherein the actuating means comprise a rod having first and second ends, the rod is mounted to slide horizontally under the filter against the urging of an elastic means, the first end of the rod controls the valve, and the rod is controlled by a movement multiplier device actuated by the pouring spout.

2. The domestic coffee maker as claimed in claim 1, wherein the multiplier device comprises a contact lever and a transmitting lever connected to the housing, the contact lever is actuated by the pouring spout and the transmitting lever directly actuates the rod.

3. The domestic coffee maker as claimed in claim 1, wherein the outflow orifice of the filter is positioned in the side wall of the filter proximal to the bottom.

4. The domestic coffee maker as claimed in claim 2, wherein the contact lever is mounted to pivot about a horizontal spindle and is movable to transmit a vertical movement, while the transmitting lever comprises a first arm and a second arm connected by an elbowed piece, and the transmitting lever is mounted to swing about another horizontal spindle such that the first arm is in engagement with the contact lever and the second arm is in engagement with the rod.

5. The domestic coffee maker according to claim 1, wherein, the second end of the rod is a free end opposite the first end, the elastic means comprises a spring having a first end connected to the housing and a second end connected to the free end of the rod.

* * * * *